United States Patent [19]

Shepherd

[11] 4,403,757
[45] Sep. 13, 1983

[54] MODULATING FLUID SHEAR COUPLING

[75] Inventor: Michael Shepherd, Carmel, Ind.

[73] Assignee: Wallace Murray Corporation, New York, N.Y.

[21] Appl. No.: 245,734

[22] Filed: Mar. 20, 1981

[51] Int. Cl.³ .................. F16D 33/12; F16D 35/00; F16D 43/25

[52] U.S. Cl. .............................. 192/58 B; 192/82 T

[58] Field of Search .......................... 192/58 B, 82 T

[56] References Cited

U.S. PATENT DOCUMENTS

| | | | |
|---|---|---|---|
| 3,174,600 | 3/1965 | Oldberg | 192/58 B |
| 3,191,733 | 6/1965 | Weir | 192/58 B |
| 3,363,734 | 1/1968 | Sabat | 192/58 B |
| 3,404,832 | 10/1968 | Sutaruk | 192/58 B X |
| 3,690,428 | 9/1972 | LaFlame | 192/58 B |
| 3,809,197 | 5/1974 | Clancey | 192/58 B |
| 3,856,122 | 12/1974 | Leichliter | 192/58 B |
| 3,880,265 | 4/1975 | Elmer | 192/58 B |
| 4,004,668 | 1/1977 | Blair | 192/58 B |
| 4,007,819 | 2/1977 | Maci | 192/58 B |
| 4,295,550 | 10/1981 | Hayashi | 192/58 B |
| 4,298,111 | 11/1981 | Hayashi | 192/58 B |

FOREIGN PATENT DOCUMENTS

| | | | |
|---|---|---|---|
| 2036266 | 6/1980 | United Kingdom | |
| 2071283 | 9/1981 | United Kingdom | 192/58 B |
| 2087049 | 5/1982 | United Kingdom | |

*Primary Examiner*—Rodney H. Bonck
*Attorney, Agent, or Firm*—Woodard, Weikart, Emhardt & Naughton

[57] ABSTRACT

A modulating fluid shear coupling apparatus is disclosed herein which comprises a driving member mounted within a working chamber defined by a driven member and rotatable coaxial with the driven member. The driving and driven members include complementary shear surfaces to effect torque transmission between the two members when shear fluid is received between the shear surfaces. The driven member defines a reservoir and includes a passageway leading from the reservoir to the working chamber. At least two annular grooves are defined by the driven member and open into the working chamber adjacent the driving member at different radial positions. The annular grooves and associated passageways leading from the grooves to the reservoir provide for pumping the shear fluid from the working chamber back to the reservoir. Various control means are provided for selectively opening and closing the various passageways to yield several different degrees of coupling between the driving and driven members.

21 Claims, 2 Drawing Figures

MODULATING FLUID SHEAR COUPLING

BACKGROUND OF THE INVENTION

1. Field of the Invention

The present invention relates to fluid shear couplings, and particularly to a coupling which provides for several distinct operating speeds.

2. Description of the Prior Art

Fluid shear couplings, such as those typically used as fan drives for vehicle engines, are well known in the art. Such couplings typically include a rotary drive disc which is driven by the engine, and which is rotatably mounted within a housing defined by a driven member. A quantity of viscous, shear liquid is admitted from a reservoir chamber to a fluid shear chamber defined by a relatively close spacing of portions of the drive disc and driven member housing. Depending upon the amount of shear liquid in the fluid shear chamber, the degree of rotary coupling between the drive member and the driven member is varied. In general, such devices lower the power loss to the radiator cooling fan or other driven component by correlating the power requirements of the driven component with the engine cooling requirement at various engine speeds and ambient temperatures.

The variance in coupling, resulting from the variation in shear fluid within the shear chamber, is usually controlled by a temperature responsive valve assembly. The valve opens to admit a larger quantity of fluid into the shear chamber when high cooling requirements are present. Closing of the valve results in a limitation of the shear fluid within the shear chamber and consequently presents a reduction of rotary coupling between the members. Such assemblies often include a passageway for the shear liquid to move from the radially outermost portion of the fluid shear chamber to the reservoir. The shear liquid is deflected so as to flow from the radially outermost part of the fluid shear chamber through the passageway and then to the reservoir chamber.

It has been the practice in the prior art to provide annular grooves in the driven member adjacent the outer perimeter of the drive member to produce the pumping action required for returning the shear fluid to the reservoir. The passageway leading to the reservoir opens into the annular groove, and a dam is positioned in the groove adjacent the passageway opening and the increased pressure caused by the fluid impacting the dam enhances the pumping action. In U.S. Pat. No. 3,856,122, issued to Leichliter on Dec. 24, 1974, there is disclosed a viscous fluid shear coupling having two opposed, arcuate channels and associated opposed holes within the channels at the same radial location outward of the shear chamber. Similar devices which include only a single channel and associated passageway opening are disclosed in U.S. Pat. Nos. 4,007,819, issued to Maci on Feb. 15, 1977; 4,004,668, issued to Blair on Jan. 25, 1977; and, 3,809,197, issued to Clancey on May 7, 1974.

In U.S. Pat. No. 3,174,600, issued to Oldberg on Mar. 23, 1965, there is disclosed a temperature-responsive fluid shear coupling which includes a rotatable member with a tangentially directed passageway opening into an annulus positioned outward of the center drive disc. The facing of the rotatable member against the disc rotation forces fluid out of the shear chamber into the reservoir, whereas directing the rotatable member in the opposite direction causes the fluid to be drawn into the annulus.

Viscous drives characteristically operate only in the fully engaged or disengaged modes. The normal drive design incorporates a fluid storage reservoir near the radial center of the drive body. This fluid is throttled to the working chamber of the drive by a thermally sensitive valve assembly as a result of changes in ambient temperature. This type of drive also incorporates the fluid pumping system which is able to return the shear fluid to the storage chamber when drive engagement is not required. The pump-back system most typically is defined by the described arrangement of an annulus near the outside diameter of the shear chamber with a fluid dam and drain-back passage located at the lagging end of the dam. Functionally, the fluid introduction valve allows fluid flow rates into the drive proportional to ambient temperature. When the entering fluid rate exceeds the pumping system's ability to remove it, i.e. at the drive engagement temperature, filling of the drive or shear chamber commences. Because the pumping system loses efficiency dramatically as the difference between input and output speed diminishes, the partially engaged condition for the typical drive is highly unstable and the unit characteristically passes directly from disengagement to full engagement.

SUMMARY OF THE INVENTION

Briefly described in one aspect of the present invention, there is provided a modulating fluid shear coupling apparatus including a driving member received within a working chamber defined by a driven member, both of the members being rotatable about a common axis. The driving and driven members have complementary shear surfaces defining a fluid shear chamber therebetween. Input flow means is included for providing flow of shear fluid from a reservoir to the working chamber. At least first and second output flow means are included for providing flow of shear fluid from two, radially-different locations of the working chamber back to the reservoir. Control means are provided for selectively opening and closing the input and output flow means to provide separate, modulated coupling conditions. In related embodiments, there are provided additional output flow means and associated control means to yield additional coupling conditions.

It is an object of the present invention to provide a fluid shear coupling apparatus which has several stable coupling conditions yielding several different speeds for the driven member.

Another object of the present invention is to provide a modulating fluid shear coupling apparatus which is relatively simple in construction, and which is reliable and durable in operation.

It is a further object of the present invention to provide a modulating fluid shear coupling apparatus which is capable of providing different coupling conditions in response to a selected temperature or other monitored condition.

It is a further object of the present invention to provide a modulating fluid shear coupling apparatus which is readily adaptable to provide differing speed relationships in response to a monitored condition.

Further objects and advantages of the present invention will become apparent from the description of the preferred embodiment which follows.

DESCRIPTION OF THE PREFERRED EMBODIMENT

Figure 1:
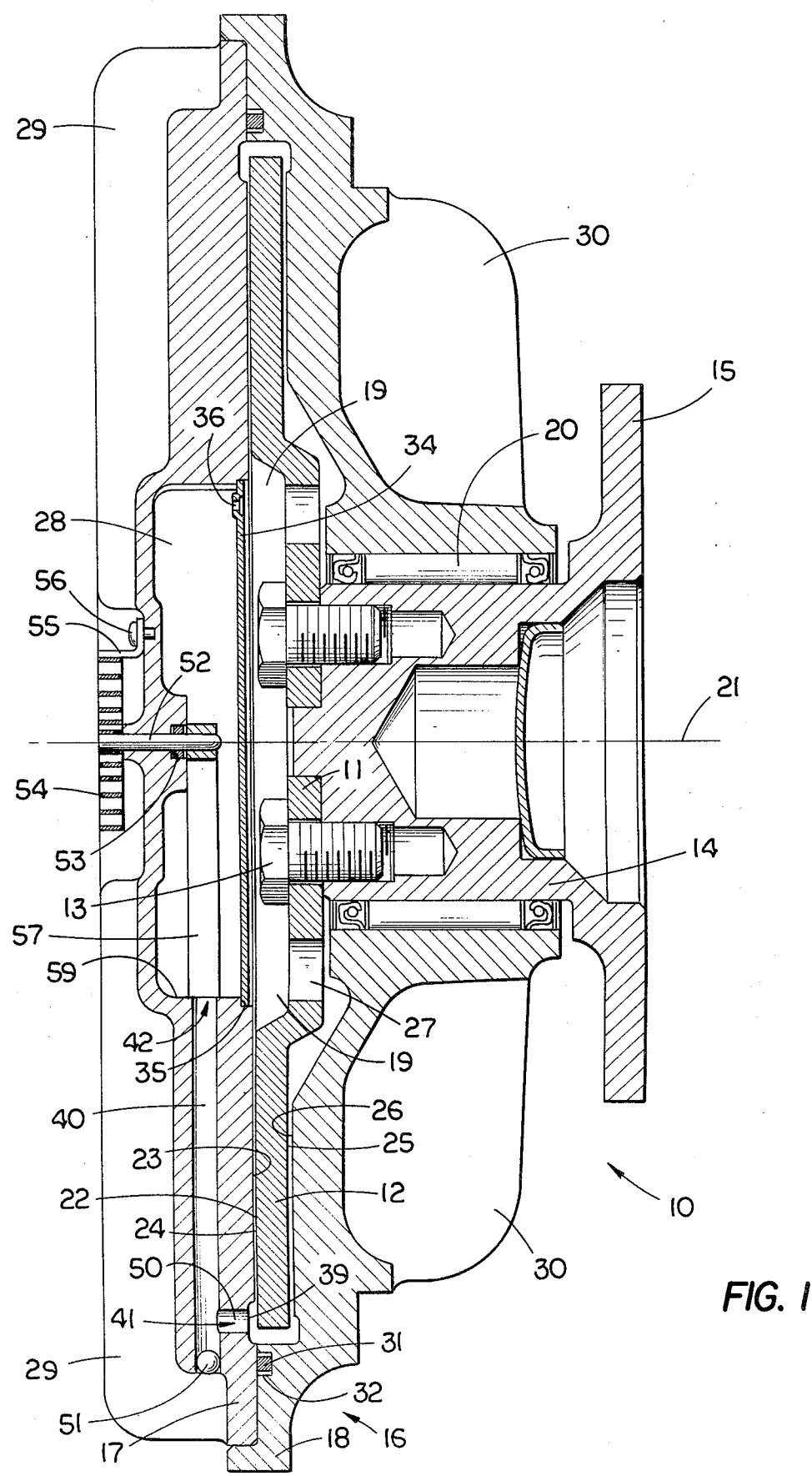
FIG. 1 is a side, cross-sectional view of a preferred embodiment of a fluid shear coupling constructed in accordance with the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring in particular to the drawings, there is shown a modulating fluid shear coupling apparatus 10 constructed in a preferred embodiment of the present invention. The apparatus 10 in conventional fashion includes a driving member 11 having a disc-shaped portion 12. The driving member 11 is mounted with bolts 13 to a center shaft 14 which includes a mounting portion 15 connectable to a drive source, such as a vehicle engine. A driven member, designated generally at 16, includes housing members 17 and 18 which define a working chamber 19 in which the driving member is received. Needle bearings 20 are received between the shaft 14 and housing member 18 to mount the driven member to the driving member and rotatable about a common axis 21.

The driving member 11 has a first side including a shear surface 22. The driven member similarly defines a shear surface 23 configured and positioned complementary with the shear surface of the driving member and defining therewith a fluid shear chamber 24 such that the presence of shear fluid within the chamber 24 will cause the transmission of torque between the driving member and the driven member. As is well understood in the art, the configuration and placement of the respective shear surfaces may be varied considerably, particularly depending upon the coupling characteristics desired for the apparatus.

As in typical fluid shear couplings, provision is also made for the transmission of axial thrust loads between the driving and driven members. In certain embodiments, the axial thrust loads are absorbed by the use of ball bearings to mount the driven member to the driving member, such as in a replacement of the needle bearings 20. In such an embodiment, the second side 25 of the driving member 11 may or may not comprise a fluid shear surface. If the additional shear surface is desired, then the housing member 18 similarly defines a complementary shaped and positioned shear surface 26 to provide for additional transmission of torque upon the reception of shear fluid within the shear chamber defined between the surfaces 25 and 26. In the preferred embodiment of the present invention, however, the axial thrust loads are borne by the surfaces 25 and 26, and the needle bearings 20 are employed to mount the driven member 16 to the driving member 11. In the preferred embodiment, the disc portion 12 includes apertures 27 which provide for the flow of shear fluid from a reservoir 28 to the opposite side of the driving member and to flow outwardly between the surfaces 25 and 26 where the axial thrust loads are carried.

Figure 2:
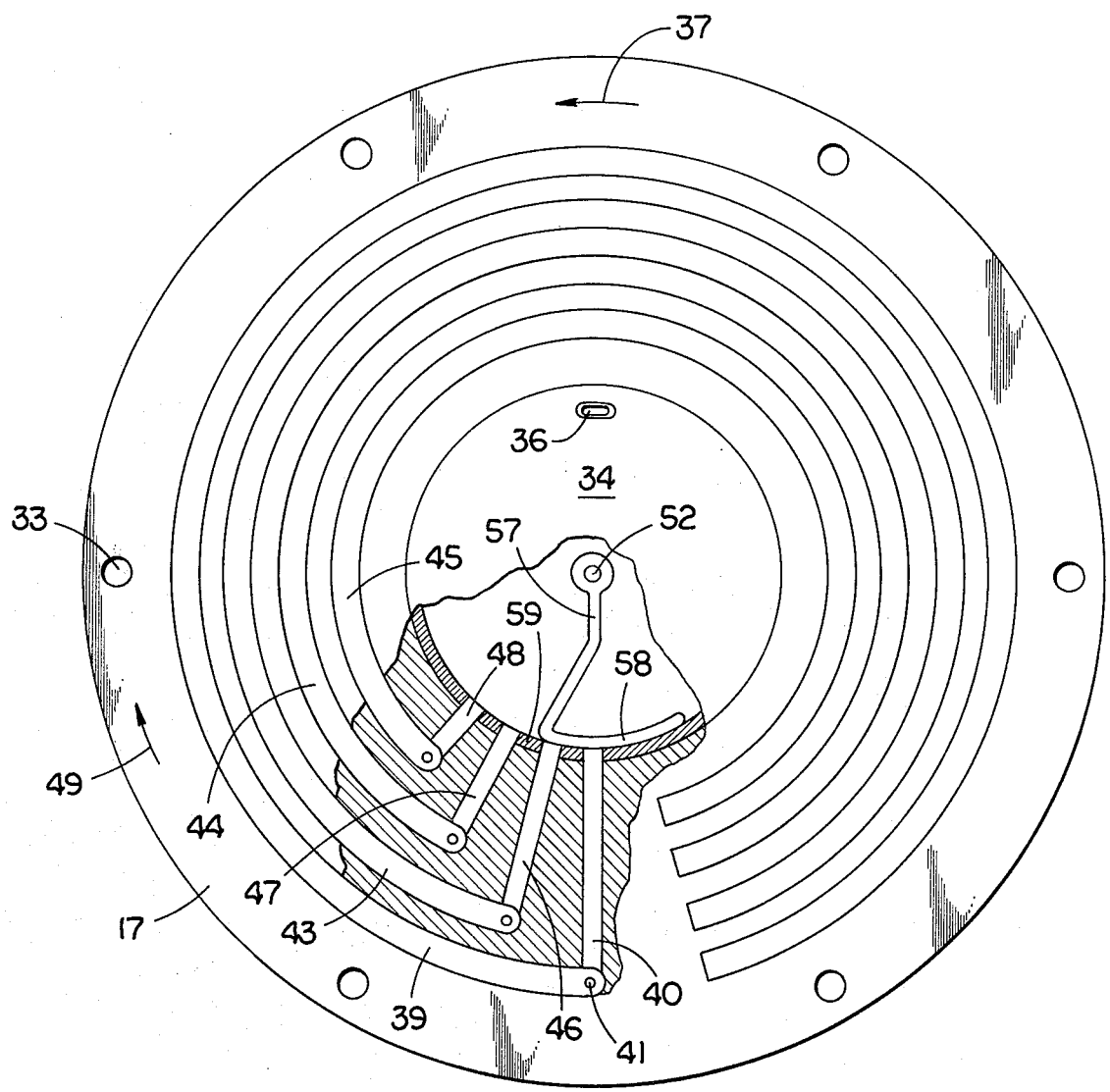
FIG. 2 is a front, elevational view of a housing member useful in accordance with the present invention, which member includes the annular grooves and associated passageways for returning the shear fluid from different radial positons in the working chamber to the fluid reservoir.

Also in usual fashion, the apparatus 10 includes several fins 29 and 30 formed with the housing members 17 and 18, respectively, to enhance heat dissipation. A circumferential seal 31 is received within an annular groove 32 in the housing member 18 and provides a seal between the housing members 17 and 18 to prevent fluid loss. The housing members are secured together with bolts (not shown) spaced about and received through apertures 33 (FIG. 2) in the perimeters of the housing members.

The apparatus includes input flow means for providing flow of shear fluid from the reservoir to the working chamber at a location radially-inward of the shear chamber or shear surface of the driving member 11. In the preferred embodiment, the housing member 17 defines the reservoir 28 in which the shear fluid may be received. A disc-shaped cover member 34 is received against an annular shoulder 35. The cover member 34 defines an aperture 36 which communicates between the reservoir 28 and the working chamber 19 to permit flow of the shear fluid from the reservoir to the working chamber.

A plurality of output flow means are included for providing flow of shear fluid from different radial positions in the working chamber (radially-outward of the input flow means) back to the reservoir. As shown particularly in FIG. 2, the preferred embodiment includes several annular pumping grooves, such as 39, spaced at different radial positions. Generally, each of the pumping grooves includes an associated passageway, such as 40, which opens at one end 41 into the associated groove, and opens at the other end 42 into the reservoir chamber 28. In the preferred embodiment, four separate pumping grooves 39 and 43-45 are provided at four different radial distances from the rotational axis of the driven member 16. Each of these grooves extends in a circular arc about the axis, and each includes an associated passageway 40 and 46-48, respectively, extending from an opening in the groove to the shear fluid reservoir 28. The axial portions of the passageways are sealed at their outer ends, such as by a plug member 51 (FIG. 1).

The described annular grooves and associated passageways connecting to the reservoir operate to provide pumping of the shear fluid from the working chamber, and particularly from the shear chamber 24, back to the reservoir. This pumping action is achieved in usual fashion as is well understood in the art, and occurs due to the fact that as the input or driving member 11 rotates in a direction 37 (FIG. 2), it drags the shear fluid along the surface of the housing member 17, and particularly through the annular grooves 39 and 43-45. The termination of the grooves shortly beyond the openings, such as 41, of the respective passageways causes the fluid to impact against the end of the groove and create a pressure increase. This increase in pressure adjacent the passageway openings causes the fluid to flow axially through the first portions of the respective passageways, such as at 50 (FIG. 1), and then radially inward along the passageways to the reservoir.

Output control means is provided for selectively opening and closing the output flow means. As shown, the output flow means include the several passageways 40 and 46-48. A control is therefore provided for closing off one or more of these passageways in the following manner. A shaft 52 is rotatably received within a hole in the housing member 17, and a seal 53 is provided to prevent leakage of the shear fluid from the reservoir chamber adjacent the shaft 52. A temperature sensing bi-metallic spring element 54 is mounted to the shaft 52 at one end, and is secured to the housing member 17 at the other end by attachment to a bracket 55 secured to the housing member with a bolt 56. The torsional, bi-metallic spring element 54 is of a type which upon sensing a change in the ambient temperature surrounding it causes a rotation of the shaft 52. More specifically, the spring element is positioned to cause a rotation of the shaft 52 in the direction 49 (FIG. 2) with an increase in ambient temperature.

Secured to the shaft 52 within the reservoir 28 is a torsional valve member 57. The valve member 57 includes an arcuate portion 58 which has an outer surface conforming to and adjacent the cylindrical surface 59 at the interior of the reservoir chamber. In this manner, the rotation of the shaft 52 will cause the valve member 57 to pivot in a direction which would cause none, one or more of the passageway openings into the reservoir to be closed. The spring member 54 and valve member 57 are positioned such that the valve member does not close any of the passageways at a temperature at which fluid shear coupling is not desired or is desired only to a minimal extent. As the temperature increases, the coupling requirement similarly increases and the valve member 57 is successively pivoted to close one or more of the passageways. With increasing temperature the valve member will successively close passageways 40, 46, 47 and 48, in that order.

In a typical application of the present invention, the fluid shear coupling is mounted to a vehicle engine and is responsive to surrounding temperature conditions to effect a change in coupling between the driving member and the driven member. The bimetal spring 54 is located in an exposed position on the front side of the housing member 17 so as to be contacted by the stream of heated air leaving the radiator of the engine with which the fluid shear coupling is associated. The bimetal spring 54 will accordingly be subjected to temperature changes in accordance with the different temperatures of, for example, the radiator air. When the bimetal spring is subjected to a temperature increase, the shaft 52 will rotate in the direction 49, when the spring is subjected to a temperature decrease the shaft will rotate in the opposite direction 37.

In accordance with the present invention, output control means are provided for selectively opening and closing the output flow means or passageways leading from the working chamber to the reservoir. Consequently, five different degrees of coupling may be achieved with the apparatus disclosed in the preferred embodiment. At the first condition corresponding to the lowest temperature and therefore the lowest coupling condition, the spring element 54 will cause the valve member 57 to be in a position in which all of the passageways 40 and 46-48 are open. In this manner, the shear fluid within the working chamber 19 will be pumped through the grooves and passageways back to the reservoir, and coupling of the driving member to the driven member will be at a minimum.

In the next higher coupling condition, the spring member 54 rotates the shaft 52 in the direction 49 a sufficient extent to cause the valve member 57 to close the radial passageway 40. Under such condition, the fluid shear chamber will be substantially filled with shear fluid radially-inward to the annular groove 43, since the outer annular groove 39 will not perform any pumping action. This means that an increased amount of fluid is maintained within the shear chamber, and increased coupling between the driving member and driven member will result. Similarly, at increased temperatures, the valve member 57 will be pivoted successively to cover the radial passageways 46, 47 and 48, providing at each instance an increased amount of coupling due to the increased amount of fluid maintained within the shear chamber. As a result, the apparatus provides for several distinct degrees of coupling in response to an increase in monitored temperature.

In order to provide distinct degrees of coupling for each of the control conditions, it is a particular aspect of the preferred embodiment of the present invention that the pumping capacity for each of the successive annular grooves be sufficient to return to the reservoir substantially all shear fluid moved into the working chamber. With respect to the preferred embodiment shown in the drawings, it is also a feature that each of the annular grooves have the capacity to pump all of the fluid entering the working chamber under the conditions that the radially-outward annular grooves have the associated radial passageways blocked. In the second coupling condition, for example, the outer annular groove 39 will not pump since the associated passageway 40 is blocked, and the groove 43 therefore will desirably return all of the shear fluid back to the reservoir under this condition.

The coupling action resulting from the presence of shear fluid within the shear chamber will cause the relative rotations of the driving member and driven members to reduce. This reduction in the relative rotation of the two members will similarly cause a reduction in the fluid pressure generated by the groove 43 and its ending adjacent to the opening of the radial passageway 46. The reduced pressure will consequently cause a reduced pumping capacity for the groove 43 than would occur if the relative rotation of the driving and driven members was the same as associated with the uncoupled condition.

In the third coupling condition, the radial passageway 46 is blocked and shear fluid is maintained within the shear chamber at least as radially-inward as the annular groove 44. The increased amount of shear fluid within the shear chamber will provide the increased coupling between the driving and driven members, and will in turn reduce the relative rotation between the two members. This will reduce the pumping capacity of the annular groove 44 below that which it would have at the higher relative rotations, and similar results will follow for the subsequent, radially-inward annular groove.

It is therefore an aspect of the preferred embodiment of the present invention that the pumping capacities for the successive, annular grooves is such that the capacity is adequate to return all of the shear fluid entering the working chamber back to the reservoir under the conditions at which the respective annular groove is desired to act as the primary pumping groove.

It will be appreciated that considerable variations could be made in the input and output flow means without departing from the principles and scope of the present invention. The use of the successive, annular grooves is preferred, however, since it employs traditional pumping mechanisms which are easily incorporated into a fluid shear coupling apparatus. Variations could also readily be made in the relative positioning and configuration of the annular grooves and associated passageways leading back to the reservoir chamber. It will be appreciated that the varying of the radial placements of the annular grooves will provide different coupling characteristics in response to a given monitoring of temperature. Also, it will be understood that other conditions could be used to trigger the various coupling conditions, such as the monitoring of speed, or the monitoring of temperatures at different locations in the engine.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A modulating fluid shear coupling apparatus which comprises:
    a driving member including a disc-shaped portion having a first side including a shear surface;
    a driven member defining a working chamber within which said driving member is received, said driven member including a shear surface configured and positioned complementary with the shear surface of said driving member and driving therewith a fluid shear chamber cooperable with a shear fluid received therein for transmitting torque between said driving member and said driven member;
    mount means for mounting said driven member to said driving member and rotatable about a common axis;
    a shear fluid reservoir;
    input flow means for providing flow of shear fluid from said reservoir to a first location of the working chamber on the first side of said driving member and radially-inward of the shear surface of said driving member;
    first output flow means for providing flow of shear fluid from a second location of the working chamber on the first side of said driven member to said reservoir, the second location being radially-outward of the shear surface of said driving member, said first output flow means being capable of returning to said reservoir substantially all shear fluid moved to the first location of the working chamber by said input flow means;
    first output control means for selectively opening and closing said first output flow means;
    second output flow means for providing flow of shear fluid from a third location of the working chamber on the first side of said driving member to said reservoir, the third location being radially intermediate the shear surface of said driving member, said second output flow means being capable, when said first output control means closes said first output flow means, of returning to said reservoir substantially all shear fluid moved to the first location of the working chamber by said input flow means; and
    second output control means for selectively opening and closing said second output flow means;
    said apparatus having a first coupling condition in which said first output control means opens said first output flow means to substantially fill the working chamber with shear fluid radially-inward to the second location and consequently to cause fluid shear coupling between said driving and driven members, said apparatus having a second coupling condition in which said first output control means closes said first output flow means to substantially fill the working chamber with shear fluid radially-inward to the third location and consequently to cause fluid shear coupling between said driving and driven members greater than in the first coupling condition, and said apparatus having a third coupling condition in which said first and second output control means close said first and second output flow means, respectively, to substantially fill the working chamber with shear fluid radially-inward of the third location and consequently to cause fluid shear coupling between said driving and driven members greater than in the second coupling condition.

2. The apparatus of claim 1 in which said first and second output control means are for controlling said first and second output flow means, respectively, in response to selected, monitored temperatures.

3. The apparatus of claim 1 in which said first output control means includes a first output valve means having a first condition opening said first output flow means and a second condition closing said first output flow means, said second output control means including a second output valve means having a first condition opening said second output flow means and a second condition closing said second output flow means.

4. The apparatus of claim 3 in which said first and second output valve means include a torsional valve arm rotatably mounted to said driven member and a bimetallic, torsional spring connected between said driven member and the valve arm to move the valve arm between first, second and third positions associated with the conditions of said first and second output valve means.

5. The apparatus of claim 1 in which said reservoir extends radially-inward of the shear surface of said driving member.

6. The apparatus of claim 1 in which said first output flow means comprises a first passageway means for providing fluid communication between the second location of the working chamber and said reservoir, said second output flow means comprising a second passageway means for providing fluid communication between the third location of the working chamber and said reservoir, said first and second output flow means further comprising first and second pump means, respectively, for moving shear fluid through the first and second passageway means, respectively, from the working chamber to said reservoir.

7. The apparatus of claim 6 in which said first and second output control means are for controlling said first and second output flow means, respectively, in response to selected, monitored temperatures.

8. The apparatus of claim 6 in which said reservoir extends radially-inward of the shear surface of said driving member.

9. The apparatus of claim 6 in which said first output control means includes a first output valve means having a first condition opening said first output flow means and a second condition closing said first output flow means, said second output control means including a second output valve means having a first condition opening said second output flow means and a second condition closing said second output flow means.

10. The apparatus of claim 9 in which said first and second output valve means include a torsional valve arm rotatably mounted to said driven member and a bimetallic, torsional spring connected between said driven member and the valve arm to move the valve arm between first, second and third positions associated with the conditions of said first and second output valve means.

11. The apparatus of claim 10 in which said first and second pump means comprise first and second annular grooves, respectively, defined by said driven member and opening into the working chamber adjacent said driving member, said first passageway means including a first passageway opening into the first annular groove and said second passageway means including a second passageway opening into the second annular groove.

12. The apparatus of claim 11 in which said reservoir extends radially-inward of the shear surface of said driving member.

13. The apparatus of claim 1 and which further includes third output flow means for providing flow of shear fluid from a fourth location of the working chamber on the first side of said driving member to said reservoir, the fourth location being radially intermediate the shear surface of said driving member and radially-inward of the third location, said third output flow means being capable, when said first and second output control means close said first and second output flow means, respectively, of returning to said reservoir substantially all shear fluid moved to the first location of the working chamber by said input flow means, said apparatus further including a third output control means for selectively opening and closing said third output flow means;
said apparatus in the third coupling condition having the working chamber substantially filled with shear fluid radially-inward to the fourth location, said apparatus having a fourth coupling condition in which said first, second and third output control means close said first, second and third output flow means, respectively, to substantially fill the working chamber with shear fluid radially-inward of the fourth location and consequently to cause fluid shear coupling between said driving and driven members greater than in the third coupling condition.

14. The apparatus of claim 13 in which said first output control means includes a first output valve means having a first condition opening said first output flow means and a second condition closing said first output flow means, said second output control means including a second output valve means having a first condition opening said second output flow means and a second condition closing said second output flow means, said third output control means including a third output valve means having a first condition opening said third output flow means and a second condition closing said third output flow means.

15. The apparatus of claim 13 in which said reservoir extends radially-inward of the shear surface of said driving member.

16. The apparatus of claim 13 in which said first output flow means comprises a first passageway means for providing fluid communication between the second location of the working chamber and said reservoir, said second output flow means comprising a second passageway means for providing fluid communication between the third location of the working chamber and said reservoir, said third output flow means comprising a third passageway means for providing fluid communication between the fourth location of the working chamber and said reservoir, said first, second and third output flow means further comprising first, second and third pump means, respectively, for moving shear fluid through the first, second and third passageway means, respectively, from the working chamber to said reservoir.

17. The apparatus of claim 16 in which said first, second and third pump means comprise first, second and third annular grooves, respectively, defined by said driven member and opening into the working chamber adjacent said driving member, said first passageway means including a first passageway opening into the first annular groove, said second passageway means including a second passageway opening into the second annular groove, and said third passageway means including a third passageway opening into the third annular groove.

18. The apparatus of claim 17 in which said reservoir extends radially-inward of the shear surface of said driving member.

19. The apparatus of claim 13 and which further includes fourth output flow means for providing flow of shear fluid from a fifth location of the working chamber on the first side of said driving member to said reservoir, the fifth location being radially intermediate the shear surface of said driving member and radially-inward of the fourth location, said fourth output flow means being capable, when said first, second and third output control means close said first, second and third output flow means, respectively, of returning to said reservoir substantially all shear fluid moved to the first location of the working chamber by said input flow means, said apparatus further including a fourth output control means for selectively opening and closing said fourth output flow means;
said apparatus in the fourth coupling condition having the working chamber substantially filled with shear fluid radially-inward to the fifth location, said apparatus having a fifth coupling condition in which said first, second, third and fourth output control means close said first, second, third and fourth output flow means, respectively, to substantially fill the working chamber with shear fluid radially-inward of the fourth location and consequently to cause fluid shear coupling between said driving and driven members greater than in the fourth coupling condition.

20. The apparatus of claim 19 in which said first output flow means comprises a first passageway means for providing fluid communication between the second location of the working chamber and said reservoir, said second output flow means comprising a second passageway means for providing fluid communication between the third location of the working chamber and said reservoir, said third output flow means comprising a third passageway means for providing fluid communication between the fourth location of the working chamber and said reservoir, said fourth output flow means comprising a fourth passageway means for providing fluid communication between the fifth location of the working chamber and said reservoir, said first, second, third and fourth output flow means further comprising first, second, third and fourth pump means, respectively, for moving shear fluid through the first, second, third and fourth passageway means, respectively, from the working chamber to said reservoir.

21. The apparatus of claim 20 in which said reservoir extends radially-inward of the shear surface of said driving member.

* * * * *

UNITED STATES PATENT AND TRADEMARK OFFICE
CERTIFICATE OF CORRECTION

PATENT NO. : 4,403,757
DATED : September 13, 1983
INVENTOR(S) : Michael Shepherd It is certified that error appears in the above-identified patent and that said Letters Patent are hereby corrected as shown below:

Column 7, line 34, "driving therewith" should read --defining therewith--

Signed and Sealed this

Twenty-ninth Day of November 1983

[SEAL]

Attest:

GERALD J. MOSSINGHOFF

Attesting Officer    Commissioner of Patents and Trademarks